US 9,367,639 B2

(12) United States Patent
Faris et al.

(10) Patent No.: US 9,367,639 B2
(45) Date of Patent: Jun. 14, 2016

(54) SYSTEMS AND METHODS FOR DYNAMIC PAGE CREATION

(75) Inventors: Andrew Boath Faris, Venice, CA (US); Anthony Dominic Amidei, Santa Monica, CA (US); Joshua Allen Rehling, Santa Monica, CA (US); Stephen Garcia, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1324 days.

(21) Appl. No.: 11/836,724

(22) Filed: Aug. 9, 2007

(65) Prior Publication Data
US 2009/0043755 A1    Feb. 12, 2009

(51) Int. Cl.
G06F 7/00       (2006.01)
G06F 17/30      (2006.01)
G06F 17/21      (2006.01)

(52) U.S. Cl.
CPC .......... *G06F 17/3089* (2013.01); *G06F 17/211* (2013.01)

(58) Field of Classification Search
CPC .............. G06F 17/3089; G06F 17/211; G06F 17/30861; G06F 17/24; G06F 8/38; G06F 21/335; G06F 21/6227; G06Q 30/0621
See application file for complete search history.

(56) References Cited

U.S. PATENT DOCUMENTS

| 7,593,928 | B2 * | 9/2009 | Canon et al. |
| 8,280,014 | B1 * | 10/2012 | Bowerman et al. ........ 379/88.13 |
| 2003/0123443 | A1 | 7/2003 | Anwar |
| 2005/0267869 | A1 | 12/2005 | Horvitz |
| 2006/0095835 | A1 * | 5/2006 | Kennedy et al. ............. 715/513 |
| 2006/0150088 | A1 * | 7/2006 | Kraft et al. .................. 715/517 |
| 2006/0200751 | A1 * | 9/2006 | Underwood et al. ...... 715/501.1 |
| 2007/0038509 | A1 * | 2/2007 | Jain et al. ........................ 705/14 |
| 2007/0156654 | A1 | 7/2007 | Ravinarayanan |

FOREIGN PATENT DOCUMENTS

WO    WO 2006/014835    2/2006

\* cited by examiner

*Primary Examiner* — Azam Cheema
(74) *Attorney, Agent, or Firm* — Martine Penilla Group, LLP (57) ABSTRACT

A computer-implemented method of dynamically creating a page module for a word on a display screen is provided. The page module is creating by determining a word provided for defining the page module, searching for text directly associated with the word and text contextually associated with the word, and, searching for media directly associated with the word and contextually associated with the word. The type of page module layout for the word is then identified. The page module layout includes placeholders for displaying at least some of the text that is directly or contextually associated with the word and at least some of the media that is directly or contextually associated with the word in the page module. The page module is then displayed by drawing the page module layout on the display screen and populating the page module layout with at least some of the media that is directly or contextually associated with the word.

25 Claims, 9 Drawing Sheets

FIG. 16B

SYSTEMS AND METHODS FOR DYNAMIC PAGE CREATION

CROSS REFERENCE TO RELATED APPLICATIONS

This Application is related to co-pending: (1) patent application Ser. No. 11/836,723, filed on Aug. 9, 2007, entitled "Systems and Method for Comments Aggregation and Carryover in Word Pages", which issued as U.S. Pat. No. 8,972,458 on Mar. 3, 2015, (2) patent application Ser. No. 11/836,721, filed on Aug. 9, 2007, entitled "Systems and Methods for Providing Enhanced Content Portability in a Word Page Module", which issued as U.S. Pat. No. 8,595,183 on Nov. 26, 2013, (3) patent application Ser. No. 11/836,719, filed on Aug. 9, 2007, entitled "Systems and Methods for Providing a Multi-function Search Box for Creating Word Pages", and, (4) patent application Ser. No. 11/836,717, filed on Aug. 9, 2007, entitled "Systems and Methods for Providing a Persistent Navigation Bar in a Word Page", which issued as U.S. Pat. No. 7,930,645 on Apr. 19, 2011, each of which is incorporated herein by reference.

FIELD OF THE INVENTION

This invention generally relates to displaying information related to a given word. More specifically but without limitation, this invention relates to generating a web page to provide information that is focused around a word. The information in the word page is presented and organized to optimize user interactivity with the web page.

BACKGROUND OF THE INVENTION

The computing industry has seen many advances in recent years, and such advances have produced a multitude products and services. Internet websites are examples of products and services, which are created to give users access to particular types of services, data, or searching capabilities. Today, websites can be readily created by most individuals desiring to post information or provide access or connectivity to other data. Websites are also created, updated, and supported to provide constantly updated current event information, news, and other information. This data is highly managed and processed so that its presentation can be easily displayed on web browsers or other Internet connected devices.

Currently to date, however, the traditional web sites provide mostly unstructured and contextually unrelated information to a user. For example, when a phrase is searched, resulting web page typically displays many links to external websites. These links to external websites are typically selected to be displayed on the web page based on phrase matching criteria without any consideration for user interactivity and/or contextual relationship with the searched phrase. Generally, the user is forced to visit many external websites associated with presented links to find more information about the searched phrase.

The user, in this example, would feel disconnected with the content browsing experience, and may get exhausted from pointless information browsing during their search for more contextually related or connected information.

It is within this context that embodiments of the invention arise.

SUMMARY OF INVENTION

Broadly speaking, the present invention fills these needs by providing a modular system that generates and presents content related to one or more content types, that are defined herein to be "vertical types." A vertical type may define a specific type of media content, such as movies, music, pictures, games, videos, gossip, etc. Each of the vertical types, in one embodiment, is presented in a page module. If more than one vertical type is presented in response to a "word" query, then a webpage is created with two or more modules, and each module may include the latest content for that vertical. Each vertical can then be navigated by users, and users can further define different views or arrangements of the content in each module, based on the received navigation of the user. Furthermore, the "word" query, when entered by the user, will define contextually related words, that can also cause the generation of new modules for the webpage. The resulting webpage is therefore dynamically generated and created, as opposed to visits to web pages that are pre-defined or constructed for conventional searching and navigation. Consequently, all searching and navigation occurs from within the webpage of modules, thus eliminating the need to perform external web searching.

In one embodiment, a computer-implemented method of dynamically creating a page module for a word on a display screen is provided. The page module is creating by determining a word provided for defining the page module, searching for text directly associated with the word and text contextually associated with the word, and, searching for media directly associated with the word and contextually associated with the word. The type of page module layout for the word is then identified. The page module layout includes placeholders for displaying at least some of the text that is directly or contextually associated with the word and at least some of the media that is directly or contextually associated with the word in the page module. The page module is then displayed by drawing the page module layout on the display screen and populating the page module layout with at least some of the media that is directly or contextually associated with the word.

In another embodiment, a computer-implemented method of defining and arranging page modules defined for a word in a word page is provided. The defining and arranging of page modules include monitoring a relative interest of a user in the page modules by calculating an interest index for the relative interest of the user in the page modules; the calculating of the interest index includes factoring user interactivity with the page modules. Moreover, the defining and arranging of page modules further include storing the relative interest of the user in a persistent storage and displaying the page modules in the word page chronologically by the interest index of each of the page modules.

In yet another embodiment, a page module for a word is provided. The page module is dynamically created through a user action related to the word. The page module includes a placeholder towards bottom of the page module to display a plurality of related words, each of the plurality of related words is related to the word with a subject context, a placeholder substantially in the middle of the page module to display a media, a placeholder towards top of the page module to display a title of the page module, a placeholder towards top of the page module to display a module search box to enable filtering of contents of the page module, and, a placeholder towards bottom of the page module to display a number denoting viewer comments count for the page module.

The advantages of the present invention are numerous. Most notably, the system and apparatus described herein provide the newest content for each vertical and/or relevant interest all to the main page, which in turn allows a user to quickly scroll the page to find what they are interested in and then dive deeper into any of the modules, each hosting a specific type and flavor of information.

Other aspects and advantages of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

The figures are provided in order to provide a thorough understanding of the present invention. The figures should not be construed as limiting the breath of the invention in any manner.

DETAILED DESCRIPTION

A system and apparatus for generating a "word page" including page modules that present content for a specific vertical (e.g., content types), is provided. A "word page" includes page modules that present content having specific context. Context can be defined based on types of media, or categories with a type of media. In one embodiment, a "vertical" defines a type of media, such as music, movies, communication, shopping, gaming, etc. Within each vertical, further contextual categories can be defined. For instance, within music, a context can be defined for types of music, each artist, etc. Thus, for purposes of clarity, the degrees and granularity by which types of context can be broken up or organized can grow over time, as further context definitions are generated for words. The "word page", as used herein, is a web page, that is constructed from one or more page modules. The page modules, as noted above, will each define a type of content, such as movie related content, music related content, picture related content, game related content, video related content, gossip related content, etc. From within the word page or specific page modules, it is possible to enter or select a "word", and that word will be used to rearrange, construct or obtain content that will define the presentation, data, interactivity, images, etc., of specific page modules. Thus, the word page is a contained page, that dynamically changes, depending on the selected or entered word. A word page is therefore not a search engine or search interface that triggers a search of web links or external websites. To the contrary, the word page will contain or generate one or more page modules, and the data that is presented in each of the page modules dynamically changes or is updated over time or based on the entered "word" or the selection of specific "words" within a particular page module of the word page.

As used herein, to be "contextually related" means that a particular word, that may be entered by a user is related to other words or phrases. Other words or phrases may be related in terms of context, and the context means that there is some weaving together of words, in terms of meaning, subject, or a combination thereof. Thus, words that are contextually related to other words or phrases may be connected in terms of coherence. Still further, context can be thought of in terms of parts of a discourse that surround a word or passage and can throw light on the meaning of the entered word. Some words, that are considered contextually related may be defined based on some descriptive interrelation, dependence, or condition, based on a theme, environment, setting, event, group of similar media, similar activities, or combinations thereof.

In one example, information retrieved for a user's interest is displayed in different types of page modules. For example, music related content is displayed in a music module, gossip related content is displayed in a gossip module, and so on. Various types of standard page modules are provided to display a set of popular content types. Unlike traditional search engines that provide links to possible information about a searched phrase, a web page (e.g., word page) is created for the entered word, as defined in one embodiment. Furthermore, the created word page provides content in a user friendly manner, as opposed to providing raw links to external web sites or web resources. Moreover, unlike traditional search engines that present links leading to possible unrelated information about a phrase, the word page hosts information either directly or contextually related to the entered word.

In one embodiment, a page module provides a filter to enable selection of particular content aspects within the same content type of the page module. The filter may be presented as a dropdown (or other interface format) that defines categories that will enable regeneration of the page module in accordance with the filter. For example, in a game module, the filter dropdown, in one embodiment, may include various game categories such as x-games, kids games, etc. Thus, the page module can be rebuilt around a selected category after the filter is applied.

The page module, in one embodiment, includes a "word bar." A word bar is defined to include one or more words that may be selected by user selection. The words in the word bar can changed dynamically based on the focused content defined in the page module, and in one embodiment, selection of a word in the word bar can cause the regeneration of the entire word page (e.g., around the context of the selected word). Consequently, selection of a word from any of the word bars associated with any of the page modules can cause the regeneration of the word page that contains one or more page modules.

The page modules in a word page are rearranged based on the user interactivity with the page module. For example, if a user interact with music module more often than any other module, the music module will be positioned towards that top of the page during subsequent visits.

With this overview in mind, the following figures will illustrate example structure and functionality of dynamic generation of page modules of word pages, based on selection or entry of a word.

Figure 1:
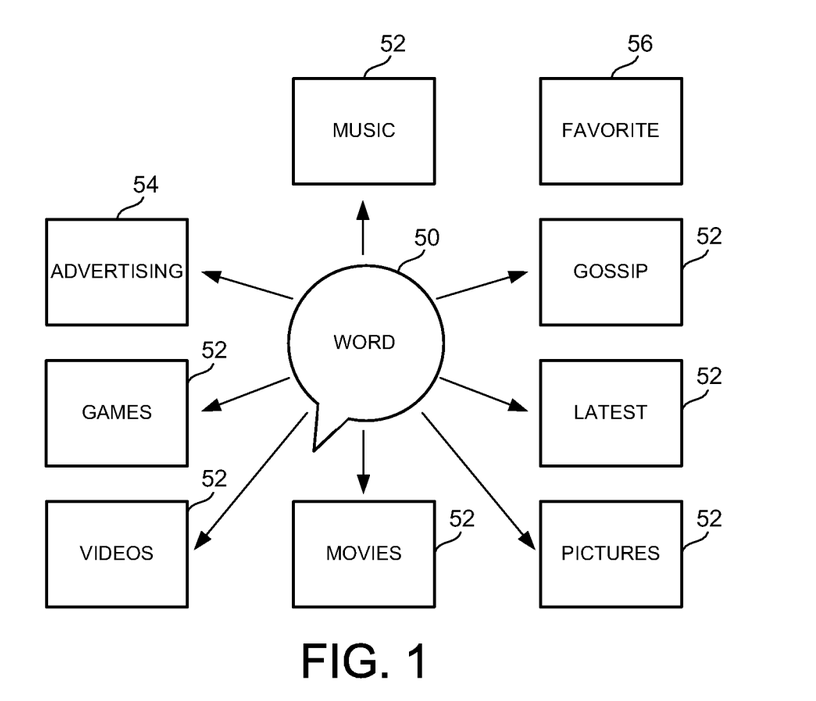
FIG. 1 illustrates a broad relationship between a word and different types of page modules, in accordance with one embodiment of the present invention.

FIG. 1 illustrates a word 50 and various broad types of page modules 52, sponsored modules 54, and, favorite module 56. In one embodiment, the page modules 52 are categorized by a specific type of content type such as music, movie, gossip, latest, sports, contests, news, financing information, charts, etc. New content types may be added to create a new page module 52. The sponsored module 54 is a special type of module that is provided or built specifically to host selected sponsored content associated with a particular word 50.

In one embodiment, the favorite module 56 is a special type of page module that is used for storing pointers or references to page modules 52 that were previously marked as "favorite". In another embodiment, various user defined content or links to external resources, media, movie clips, albums, etc. may also be stored in the favorite module 56. In yet another embodiment, the favorite module 56 contains content specific to a particular user. Such content is added to the favorite module 56 through user action. In yet another embodiment, one or more page modules 52 are generated for the entered word 50 "favorite". The page modules 52 that are generated for the entered word 50 "favorite" contain user's favorite content in one or more vertical category such as music, movies, events, etc. User's favorite content in one embodiment is based on the logged in user's the user profile information including at least one of user's preferences, age, sexual orientation, geographical location. In another embodiment, if the user has not logged in, user's content browsing pattern and interactivity with the page modules is stored the cookies or temporary files which are then used to generate or assemble user's favorite content in various vertical content categories. In yet another embodiment, the generation of user's favorite content is based on a combination of user profile information and user's interactivity with the page modules 52 during one or more prior word website browsing sessions.

As illustrated in FIG. 1, word 50 surrounded by page modules 52, sponsored modules 54, and favorite module 56, signifies that a quest for information related to the word 50 leads to generation of various types of page modules 52 and sponsored modules 54, each hosting a specific type of content. Word 50 relates to a concept, person, brand, etc and functions as a carrier of meaning. FIG. 1 further illustrates that generation of the word page revolves around selection of the word 50, i.e. information displayed through various page modules 52 is focused on the selected word 50. For example, selecting "popular" for word 50 will generate a word page with the most popular content for each respective page module (such as popular movie, popular music, popular celebrity, popular fashion, popular club, etc.). A new word page including a different set of page modules 52, is generated every time a new word 50 is selected. Hence, in above example, when the selection changes from "popular" to "newest", a new word page including page modules 52 such as "newest movies", "newest music album", "newest car models", etc. will be generated. In one example, the word page for word 50 "newest" will have a movie page module displaying trailers from the recently released movie "Spider Man 3" and a news module listing the latest news bulletins collected from one or more news sources.

In one embodiment, the system maintains a list of words 50 and a list of appropriate page modules 52 for various types of content related to each of the words 50 in the list. For example, for word 50 "newest" the system may have a movie module, a games module, a music module, a news module, and a gossip module, etc. in the list. Hence, in this example, a word page generated for word 50 "newest" will have a movie module, a games module, a music module, a news module, and a gossip module, by default. In one embodiment, words 50 and page modules 52 are maintained and updated by the information editors with the help of user's browsing patterns, latest stories about various celebrities, products, etc., various topics that users may be interested in, the latest news, etc. Content is grouped in different categories such as content related to a particular subject or word suitable or liked to a particular segment of users. In one embodiment, content is regularly and continuously updated to keep up with the latest developments. In another embodiment, various types of content are scanned and obtained from various electronic media sources automatically, based on context based search filters.

Figure 2:
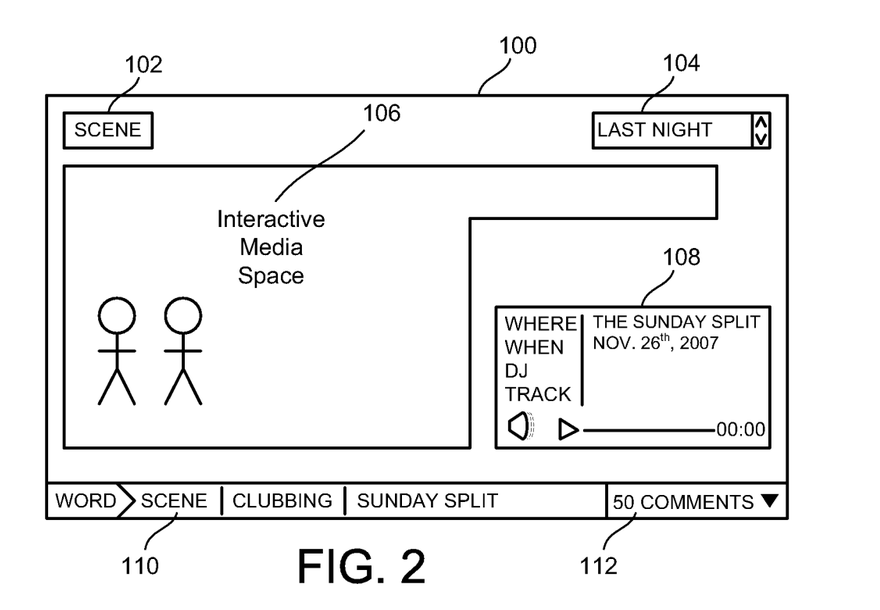
FIG. 2 illustrates a page module layout showing various placeholders of a page module, in accordance with one embodiment of the present invention.

FIG. 2 illustrates a page module layout 100. In one embodiment, the page module layout 100 includes a title 102, a filter 104, a interactive media space 106, a media metadata placeholder 108, a word bar 110, and a comments control 112. The page module layout 100 is capable of being modified to accommodate different types of content. For example, media metadata placeholder 108 may be made invisible to enable interactive media space 106 to be used for a full screen media display. In another example, interactive media space 106 may be broken up into two or more media spaces for showing multiple media content simultaneously or side-by-side. In yet another example, a section of interactive media space 106 may be used for playing a video while other sections may be used for displaying thumbnail pointers to other media content. In another embodiment, a page module may not include the word bar 110. In yet another embodiment, a page module may not include one or more of the media metadata placeholder 108, the filter 104, and the comments control 112.

The title 102 is used to display a title of content of a page module 52, sponsored module 54, or, favorite module 56. Text displayed in the title 102 is also a word 52, i.e. the title is selectable by a user and such selection would also triggers a generation of a new word page focused around the word 50 in the title 102. In one embodiment, some of the commonly used titles are music, movie, latest, gossip, etc. Title 102 is generally a topic name of content in the page module 52. For example, a page module 52 with title 102 text "music" will have contents either directly or contextually related to music.

Still referring to FIG. 2, because title 102 is also a word 50 that has its own context around it, selecting the title 102 will generate a new word page to display various page modules 52 centered or focused around the word. For example, in a word page focused around word 50 "Lindsay Lohan" that contains a module named "Music" (i.e. "Music" is the title 102 of the page module 52) featuring the music of "Lindsay Lohan", selecting (or clicking) on the title 102 of "Music" page module 52 would cause generation of a new word page now focused at music. This new word page will, for instance, have page modules 52 focused at classical music, newest music album, heavy metal, jazz, etc., all centered around and focused on "Music". Thus, as used herein, a word does not have to be a single word, but can be a set of words to define a person, place or thing. A word, however, is different than a phrase which may be in the form of a sentence. Therefore, broadly speaking, a word can be a single word or tight collection of words that convey context.

Thus, cyclic generation of word pages that include only contextually relevant and highly focused information provide a higher degree of browsing experience because the user is not forced to jump from one website to another website in search of relevant content.

In one embodiment, the word bar 110 is provided to display other words 50 related to the subject matter of the page module 52. Word bar 110 may include words 50 that are contextually related to the subject matter of content of the page module 52. For example, word bar 110 in a scene module may contain words 50 "Clubbing", "Sunday Split", etc. because these words 50 are contextually related to the topic of page module 52.

In one embodiment, the word bar 110 may also contain one or more sponsored words 50. Sponsored words 50 are bought (or paid for) by advertisers and can be displayed in the word bar 110 when a specified sponsoring criteria is met. In another embodiment, the system identifies a sponsored word to be included in the word bar 110 based on the user interest in a particular type of subject matter, user's past browsing history, user's like for a particular brand, etc. Selecting a word 50 in the word bar 110 will generate a new word page to display page modules 52 and optionally sponsored modules 54 centered around and focused on the word 50 selected through the word bar 110. Hence, in this embodiment, if a word page is generated around a word 50 "Celebrity" in which a page module named "Music" is displayed, the word 50 "N-Sync" would appear in the word bar 110. Selecting (or clicking) the word 50 "N-Sync" in the word bar 110 will cause generation of a new word page. This new word page will, for instance, have page modules 52 such as Music, Latest, Gossip, etc., all centered or focused around the word "N-Sync".

In one embodiment, a word bar 110 can be used for targeted advertising campaigns. For example, the marketer of the brand Pepsi™, through a advertising relationship, relates the word "N-Sync" with the word "Pepsi". Hence, in a word page centered around word 50 "N-Sync" that includes a "Latest" page module 52, word bar 110 in the "Latest" page module 52 may include a word 50 "Pepsi". Selecting word "Pepsi" on the word bar 110 would generate a new page focused on brand "Pepsi" and including content provided or specified by the advertiser. In one example, this sponsored content also includes content that is unrelated to the sponsored brand (e.g. a word page focused on "Pepsi" may include page modules 52 to enable presentation of clips from the latest movies or latest music albums).

In order to make sponsored content unobtrusive, factors such as visual appeal, motion, and, minimal contribution to clutter, etc. are considered. Hence, at a first glance of the word page, advertising seems to be missing, but when a user interacts with any of page modules 52, sponsored content are intermixed with content of page modules 52. In one embodiment, this mixing of sponsored content with content of page modules 52 is done without jeopardizing contextual relationship of the entered word 50 with content of page modules 52.

In one embodiment, comments control 112 has two states i.e. a closed state and an expanded state. In closed state, comments control 112 shows a number referring to a number of comments written by the users for a page module 52 that includes a particular type of content focused on a particular word 50. Comments control 112 may be expanded by selecting or clicking on the word. In the expanded form, comments control 112 displays a full text of comments and replies to these comments. In one embodiment, a comment may be replied, a reply to a comment may be replied, and so on. The comments and replies are laid out for easy identification between a comment and a reply.

A comment or a reply or a reply to a reply may be in textual form, an audio form, or in an audio visual or audio-video form. The expanded view of comments control 112 provides functionality to control the audio and visual aspects of audio or audio-visual comments through volume and video controls provided therein.

Figure 3A:
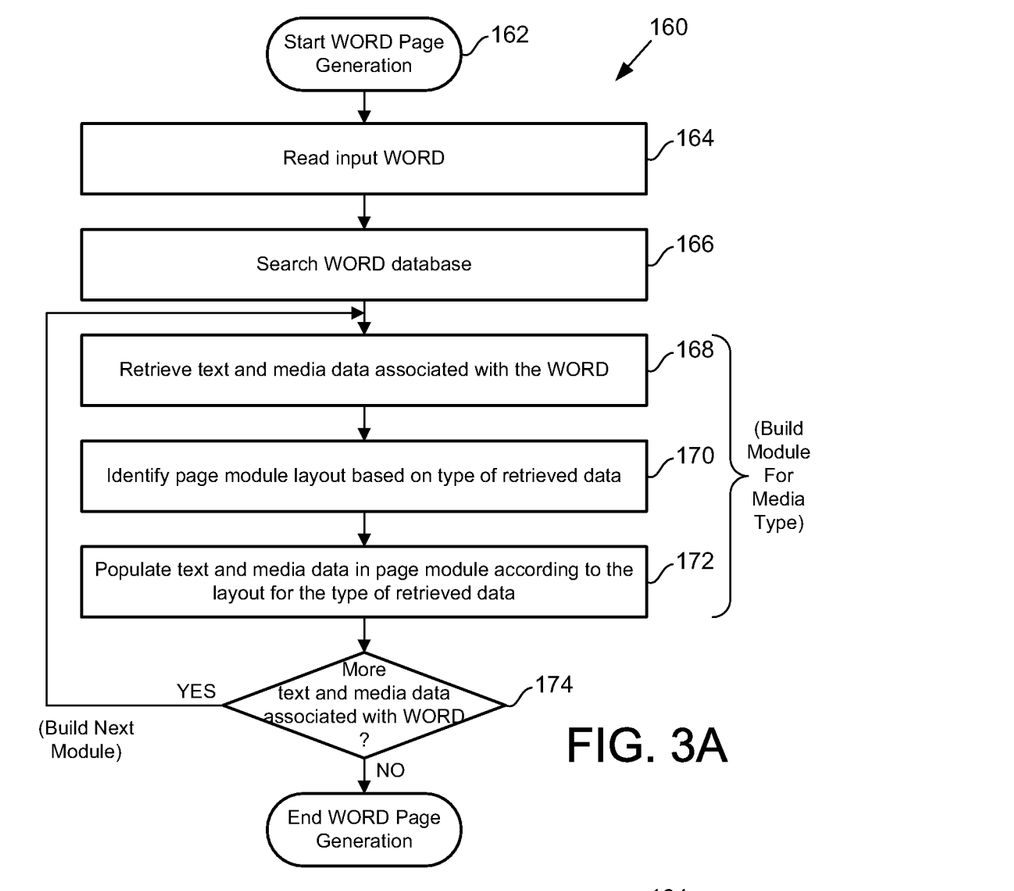
FIGS. 3A and 3B illustrates a flow diagram of the page generation process, in accordance with one embodiment of the present invention.
Figure 3B:
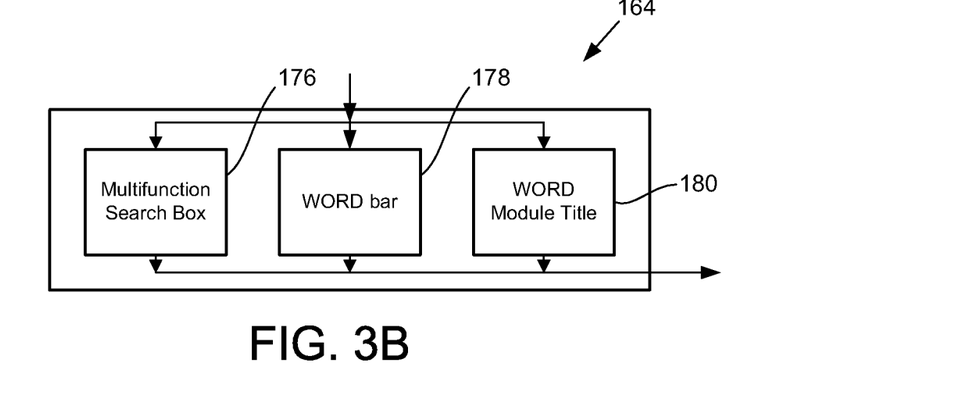

FIGS. 3A and 3B illustrate a flow diagram illustrating a process of generating a word page 160 in one embodiment. In this embodiment, word page generation starts 162 by reading entered word 164. As illustrated in FIG. 3B, the word 50 may be entered 164 through a multifunction search box 176, through a page module word bar 178, or through a page module title 180. A search is conducted 166 for entered word 50 in a database. A list of words 50 along with directly and contextually related content, including text and media, are stored in one or more databases (see FIG. 16A). In one embodiment, one or more relational databases are employed. In another embodiment, a combination of various types of data stores such a relational databases, object databases, active directory server, LDAP server, etc. may be employed.

In one embodiment, the database or a group of databases contains all content necessary to generate a word page from an entered word 50. In another embodiment, database or a group of databases may contain links or references to external sources from where information may be retrieved and formatted for displaying in page modules 52, and sponsored modules 54. Comments (and replies to comments) related to specific objects (such as a picture, part of the picture, a video, a quote, an event, etc.) on page modules 52 and sponsored modules 54 are also stored in databases along with a relationship of a comment to an object to which the comment relates.

Text and media directly and contextually related to the entered word 50 is retrieved 168 from the database or a group of databases. A media includes movies, videos, audios, audio-video, still pictures, or any other type of non-textually visual presentations. Based on the type of media and text, a page module layout 100 based on the subject matter of the retrieved data is identified 170. The page module layout 100 is populated with the retrieved text and media 172 to form a specific type of page module 52 or sponsored module 54. The system continues looking for relevant data to generate page modules 52 in the word page 174. Generation of word page ends when system no longer finds contextually relevant data in database or in the group of databases, or in one or more external sources.

In one embodiment, when database does not contain content related to entered word 50, the system tries to retrieve relevant information from a configured set of external sources through a commercially available internet search engine such as Yahoo™ Search.

Figure 4:
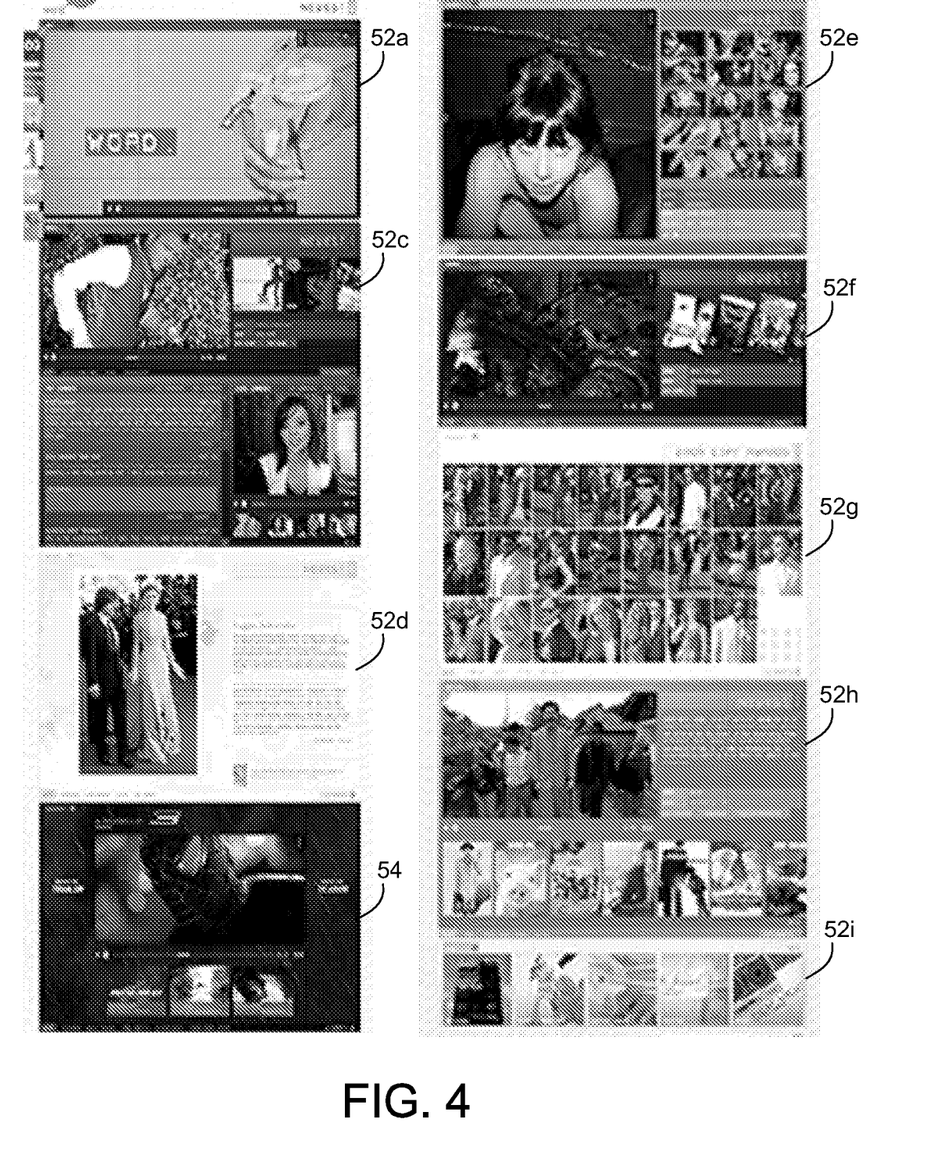
FIG. 4 illustrates some of different types of page modules, in accordance with one embodiment of the present invention.

FIG. 4 illustrates various types of page modules 52 and a sponsored module 54. Filter pull down module 52*a* presents the most popular and hottest words 50 related to a searched word 50. For example, the Filter pull down module 52*a* is used to present a list of related words 50. Selection of any of the word 50 in this list rebuilds the entire page around that selected word 50.

In one embodiment, a "Today" module (not shown the FIG. 4) may be shown in a word page. The Today module contains an editorial peak at what's big today with branded bumpers, content clips, and interactive games with new version available frequently. Thus, this content is related either directly or contextually to the searched word 50 which led to the generation of the Today module 52.

FIG. 4 also illustrates a Music module 52*c*. In one embodiment, this module contains the newest music videos and is filterable by genre. The Music module 52*c* displays text and media directly or contextually related to the searched or selected word 50. The media may be watched full screen using the BIG button (240, FIG. 9). Commenting is also available for each piece of content by clicking on the comments control 112. Commenting for each module may vary by content type (e.g. text, video, audio, etc.)

A Gossip module 52*d* is provided to show the newest "street talks" about some specific contents or personality profile retrieved for the searched WORD 50. In one embodiment, the Gossip 52*d* module also displays preview of past information about the subject matter and the source of the information.

FIG. 4 also illustrates a Spider Man module 54, a paid or sponsored module. This sponsored module 54 illustrates an example of an advertiser being able to buy and collaborate on a complete module to show their relevant content. In one embodiment, this module may live temporarily on the main page and much longer on the movie page for instance because the subject matter "Spider Man" is more closely related to movies or entertainment. Use of the context or relationships of subject matter ensures a better browsing experience for the user because information directly or contextually related to the word 50 or the subject matter of the contents being viewed by the user is presented to the user.

A Scene module 52*e* is a special type of page module 52. The Scene module 52*e* pulls photos from parties and events based on geo-targeting with a place for adding comments on one or more scenes, pictures, or media in the Scene module 52*e*. In one embodiment, each scene is provided with a note box for writing comments. A DJ mix is also provided in this embodiment for a more immersive browsing experience. Moreover, the scenes in the Scene module 52*e* may be viewed in full screen mode or in slideshow mode either with or without an audio associated with the scenes.

A Games module 52*f* is also illustrated in FIG. 4. In one embodiment, the Games module 52*e* contains video game trailers, game play footage, interviews, and reviews of video games. The games in the Games module 52*f* may be sorted via the filter dropdown 104.

A Celebrity Photos module 52*g* may also be included in the word page depending upon either a user preference, user browsing behavior, or, the subject matter of the word search, etc. This module shows a collection of celebrity photos that may be enlarged for viewing. The selection of photos included in this module is in direct or contextual relationship with the entered word 50. The photos may be viewed in a slideshow format. In one embodiment, additional information about a photo or a picture is displayed when the photo is selected or clicked by the user. Additional information may include a general description of the photo, names or one or more celebrities in the photo, location of the shoot, occasion, etc.

A Movie module 52*h* may also be included in a word page for an entered word 50. The Movies module 52*h* is an expanded video module with more room for metadata and an expanded thumbnail navigation. In one embodiment, the expanded thumbnail navigation is used for showing movie posters. This embodiment may also include action controls for operations such as "show times", "add to Netflix™ queue", etc. The movie trailers may be filtered by genre. In another embodiment, a filter criteria based on the category of movies may be employed. In another embodiment, full length movies may be included in this module. The movies may be viewed full screen. In one embodiment, the full screen view also includes navigational elements for picking other trailers and filtering.

The Next module 52*i* may be provided in a word page. In one embodiment, the Next module 52*i* contains highlights of top words 50 that weren't on the top page. Selection of any of these words 50 would reload the entire word page with the information focused around the selected word 50. This module continues the browsing experience for a user who has consumed the entire page.

Figure 5A:
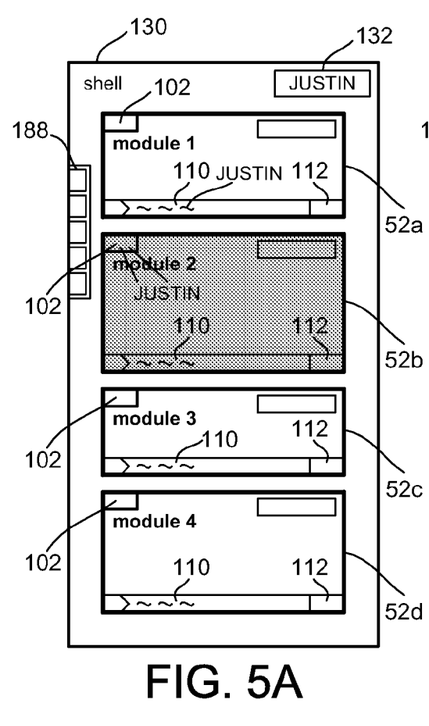
FIGS. 5A and 5B illustrates a word page including some of its parts, and, a page filtering process, in accordance with one embodiment of the present invention.
Figure 5B:
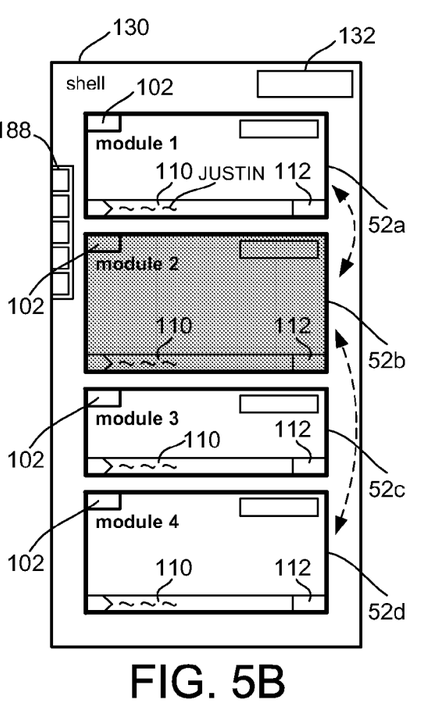

FIGS. 5A and 5B illustrate a page module including a shell 130, a multifunctional search box 132, a persistent navigation bar 188, one or more page modules 52. In one embodiment, the word page includes one or more sponsored modules 54. The favorite module 56 may be displayed when user chooses it to display. In one embodiment, the favorite module 56 is displayed by default. As illustrated in FIGS. 5A and 5B, game module 52*f*, music module 52*c*, movie module 52*h*, and, scene module 52*e* include a title 102, a word bar 110 and a comments control 112. In one embodiment, game module 52*f*, music module 52*c*, movie module 52*h*, and, scene module 52*e* are derived from page module 52 to show a specific type of content.

Referring to FIG. 5A, in one example, Word 52 "Justin" is shown in the multifunction search box 132, the word bar 110, and, the title 102 to illustrate that choosing or selecting this word 50 from the multifunction search box 132, the word bar 110, or the title 102 would result in the same results i.e. reloading or generating the word page focused around word 50 "Justin".

FIG. 5B illustrates that by creating content grouping in game module 52*f*, music module 52*c*, movie module 52*h*, and, scene module 52*e*, game module 52*f*, music module 52*c*, movie module 52*h*, and, scene module 52*e* are enabled to shift up and down in the word page by relevance, freshness, and popularity, etc. Each module type is reused on subsequent pages making the system scalable and interaction system clear and memorable.

Shell 130 of a word page may contain a logo of the choice of a website host, sign-in/up functionality to enable users to either login or signup to be a new user. In one embodiment, login functionality is used to track user browsing pattern or behavior to help the word page show the most interesting contents to the logged in user. Shell 130 may also contain a background image or theme which may be selectable by a user, and, a scroll bar to move word page content up or down on the display screen.

In one embodiment, a word page determines which page modules 52 and sponsored modules 54 should be displayed. Word page also determines a display order of included page modules 54 and sponsored module 54 based on module prioritization of newness, events (i.e. New music Tuesdays, etc.), adaptive personalization via user interactions (for example, if a user views game related content more than anything else, game module will move up the word page and other modules 52 displaying game related content may be added in the word page), and editorial/sales placement (i.e. big product releases or a sold event may impact how high up the page it may appear). In one embodiment, content within each page module is determined by the page modules themselves based on adaptive personalization via user interactions, etc. When a vertical category is selected in the multifunction search box 132, the word page is generated according to entered or selected word 50. For example, selecting "movies" will still load a page with a music module, but it would be set to soundtracks.

Figure 6:
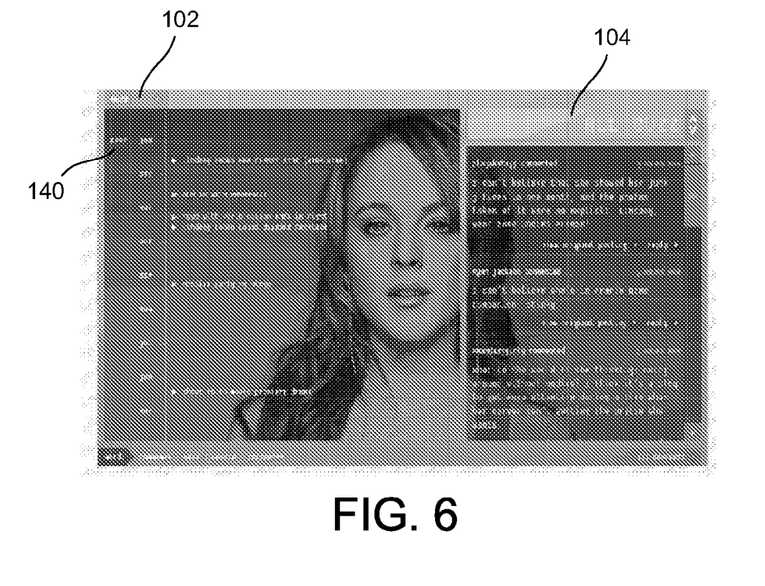
FIG. 6 illustrates one type of page module dynamically created to show contents in a specific manner to produce better user interactivity, in accordance with one embodiment of the present invention.

FIG. 6 illustrates a sample page module 52. In one example, this module is included in a word page focused around "Lindsay Lohan". The title 102 of this sample module is "Buzz". A timeline 140 shows names of month and events that occurred related to "Lindsay Lohan". The content may be sorted using the filter 104. The module also illustrates various comments left by the users or editors of the module. A user may write comments or reply to one or more existing comments. This example illustrates how content is selected around a word 50 in relevant topics and how the contents are made interactive and interesting to a user. The contents will be continuously refreshed to include newer occurrence of events. Hence, the users are tempted to come back over and over to the module of the word page.

Generation of a word page includes handling of constantly changing content, cross-vertical news and events, and varying time spans of freshness (i.e. new music is released once a week while photos and gossip may be added every few hours). The ever changing content make manual personalization less useful and less effective. Hence, in one embodiment, an adaptive personalization process is employed in the generation and ordering of content in the word page.

Figure 7:
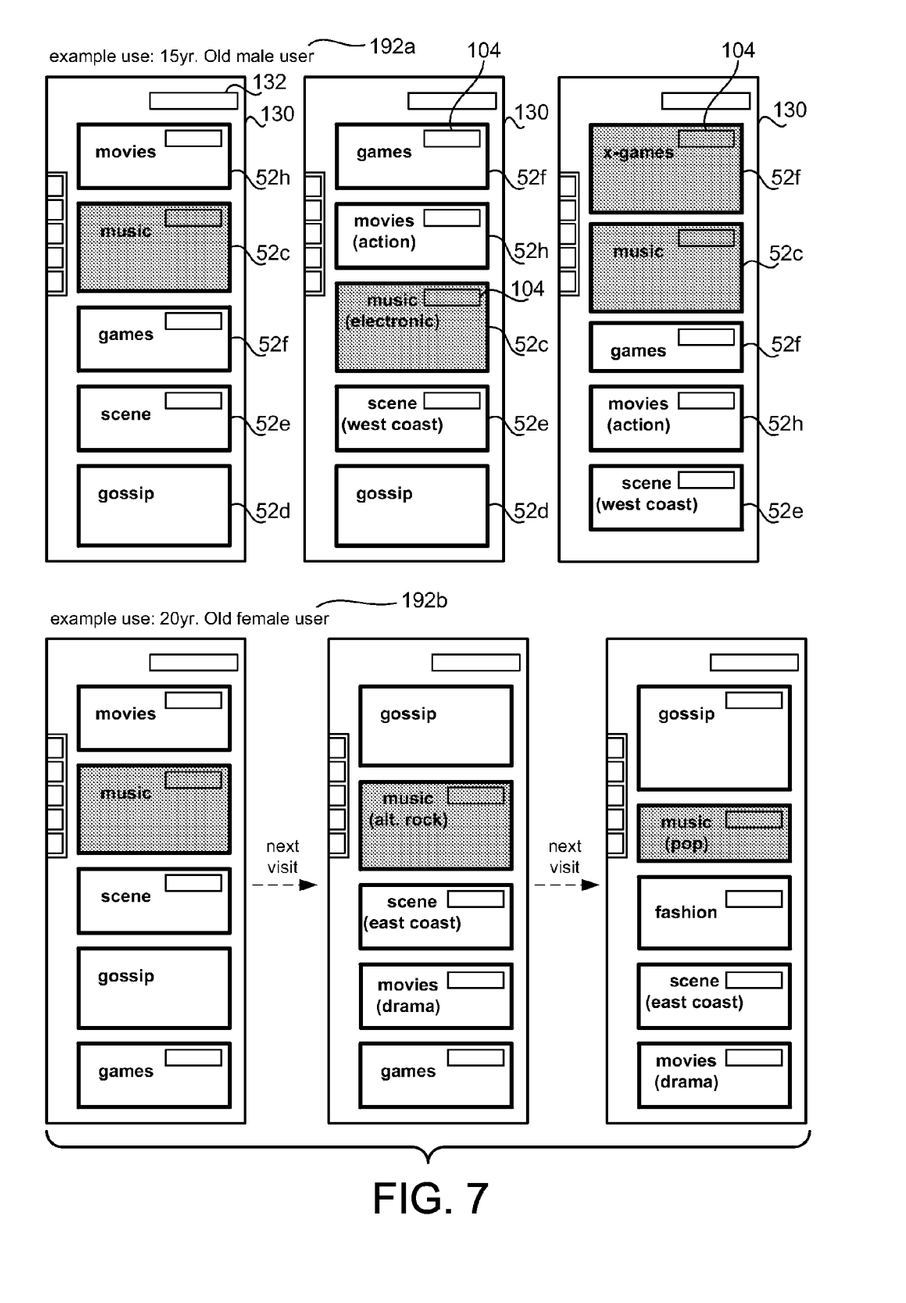
FIG. 7 illustrates a process of moving the page modules up or down in the word page based on a relative interest index of the page modules, in accordance with one embodiment of the present invention.

FIG. 7 illustrates adaptive personalization process as employed in one embodiment. With adaptive personalization, a word page is able to take into account user's interactions with some content and lack of interaction with other content to determine what topics the user is most interested in. And, through this determination, the adaptive personalization process begins bringing page modules 52 displaying interesting topics toward the top of the word page. In another embodiment, adaptive personalization process employed in the generation of word pages begins to change the filter in the page modules 52 to customize or tailor content in the page modules 52 according to user's interaction with the page modules 52. In yet another embodiment, new page modules 52 that otherwise wouldn't be displayed to a user during the first visit to a word page, may be displayed to the user during subsequent visits to the word page based on a determination made by the adaptive personalization process by taking user's interactivity with the content of the word page into account.

FIG. 7 illustrates adaptive personalization through examples. In one example, a 15 year old male user 192a visits a word page, including a shell 130, focused around an entered word 50. In one example, word 50 is entered through the multifunctional search box 132. In another example, word 50 may also be selected from the dropdown menu of the multifunctional search box 132. In yet another example, word 50 may be a default word in the multifunctional search box 132. In the first visit to the word page focused around an entered word 50, the word page displays a movies module 52h on the top of the word page followed by a music module 52c, a games module 52f, a scene module 52e, and a gossip module 52d. Movie module 52h and music module 52c are displayed on the top of the page because the adaptive personalization engine decided that a 15 year old male user would be most interested in movies and music content. In subsequent user visits to the word page, the adaptive personalization engine learns about a user's preferred content including relative preferences to various types of content. As the user interacts more and more with content displayed in page modules 52, the adaptive personalization engine continues learning and fine tuning display of content for a particular user. Adaptive personalization affects the layout of the page modules within the word page. For example, the most visited module type (regardless of the word) can be displayed for the user based on implicit or explicit user behavior.

Still referring to FIG. 7, in a next visit to the word page by the 15 year old male user 192a, the page modules 52 are ordered differently. Game module 52f is pushed to the top of the word page based on previous interactivity and other deciding factors. In one embodiment, the order of page modules 52 is decided based on factors such as previous interactivity of the user 192a with the content of the word page, age of the user 192a, general preferences of other users of user 192a age, current events, general preferences of members of user's community, etc. In one embodiment, one or more of these user preferences are obtained from information stored in the Internet browser cookies. In other embodiment, the user preferences and community preferences are obtained from the user registration storage.

Still referring to FIG. 7, a game module 52f in which the games are pre-filtered to "x-genre" category is pushed to the top of the page in user's 192a subsequent visit to the word page. In this embodiment, showing game module 52f pre-filtered to "x-genre" game category is based on user's 192a like for x-genre games during previous visits to the game module 52f. Furthermore, more than one game module 52f can be displayed to the user 192a based on his strong liking for games related content. In one embodiment, the page module rankings are cut across the word pages i.e. user's preference for a particular type of content remains a factor in the generation of a web page focused around any word. For example, if a user was most interested in games related content in the word page focused around "word A", user will see content related to the games at an elevated position in a new word page focused around "word B".

FIG. 7 also illustrates that adaptive personalization will be different in one embodiment for a 20 year old female user 192b based on general preference of other 20 year old female users for types of content, previous interactivity of the user 192b with the word page, etc. As illustrated in FIG. 7, the female user 192b shows no interest in video games, but, shows relatively higher interest in gossip. Hence gossip module 52d is displayed on the top of the word page in a subsequent visit by the female user 192b.

In one embodiment, a combination of interests and interactions enables the adaptive personalization engine to determine what additional content users may enjoy the most and what content should be higher on the word page for their frequency of interaction.

Figure 8:
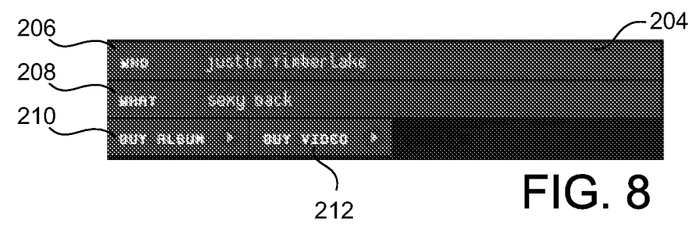
FIG. 8 illustrates a media metadata display control, in accordance with one embodiment of the present invention.

FIG. 8 illustrates a metadata display 204. The metadata display 204 is included in multimedia metadata placeholder 108. The metadata display 204 includes various placeholders for displaying various components of media metadata. In one embodiment, metadata display 204 includes a "Who" display 206, a "What" display 208, a "buy album" control 210 to enable users to buy an audio album that is being played in page module 52, and a "buy video" control 212 to enable users to buy a video album that is being played in page module 52.

In one embodiment, media is a video, in another embodiment, media is a still picture, and in yet another embodiment, media can be one of audio-visual, audio, music audio album, music video album. In yet another embodiment, media could be any visual presentation that is capable of being displayed in the page module 52. Metadata display 204, as illustrated in FIG. 8, pertains to a music album. In other embodiments, metadata display 204 may take different shape and display different meta information based on the type of media.

In one embodiment, "Who" placeholder 206 displays identity of the singer or actor of the media. "What" placeholder 208 displays name of the song or title of the media. "Buy Album" control 210 initiates a transaction by which a user can buy the audio album of the song that is being played in page module 52. "Buy Video" control 212 initiates a transaction by which a user can buy the video album of the song or a music title that is being played in the page module 52.

Figure 9:
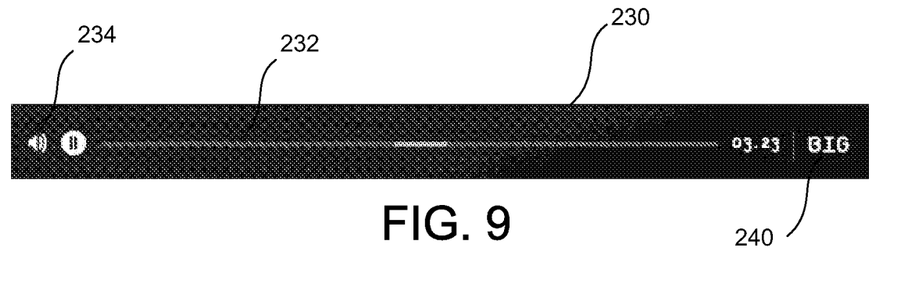
FIG. 9 illustrates a media play and volume control, in accordance with one embodiment of the present invention.

FIG. 9 illustrates a media control 230. In one embodiment, the media control 230 is also included in a multimedia metadata placeholder 108. Media control 130 includes an audio control 234 to control sound volume of an audio media. Audio control 234 also provides sound muting functionality. A media control bar 232 is provided to control the media or audio playing. Media control bar 232 is used to indicate a position of current frame of audio slice in the media. Media control bar 232 can also be used to manually move the frames of audio forward or backward, stop the play, resume the play, etc.

In one embodiment, media control 230 also includes a "BIG" control 240. "BIG" control 240 is used to view media in a full screen mode. Selecting "BIG" control 240 enlarges the media in page module to occupy all available space in page module to show the media in full screen. In one embodiment, the media control 230 remains visible on the full screen view of media. Caption of "BIG" control 240 changes to "LIL" when media is being shown in a full screen mode. Selecting "BIG" control 240 when "BIG" control 240 is showing caption "LIL" reverts back the media to original viewing mode.

Figure 10:
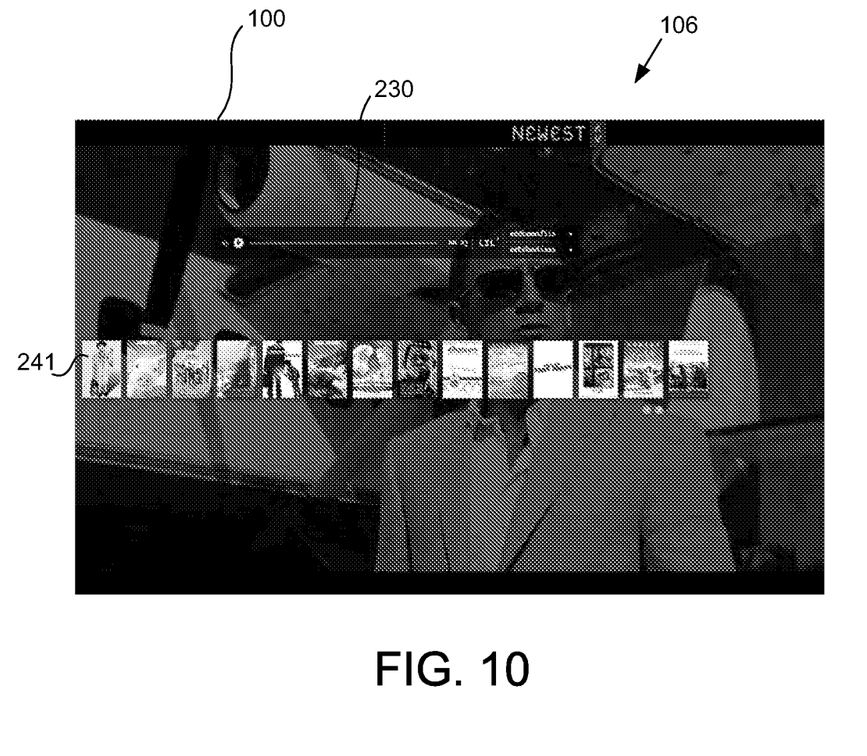
FIG. 10 illustrates a full module view of a media in the module, in accordance with one embodiment of the present invention.

FIG. 10 illustrates a movie module 52h in a full screen view. As illustrated, interactive media space 106 is enlarged to take entire page module layout 100. Display control 230 remains visible when media is being displayed in a full screen mode to control audio visual aspects of the media. In one embodiment, movie library thumbnails 241 also remain visible over the media to enable a user to select another movie clip for viewing in full screen mode without leaving the full screen mode.

Figure 11:
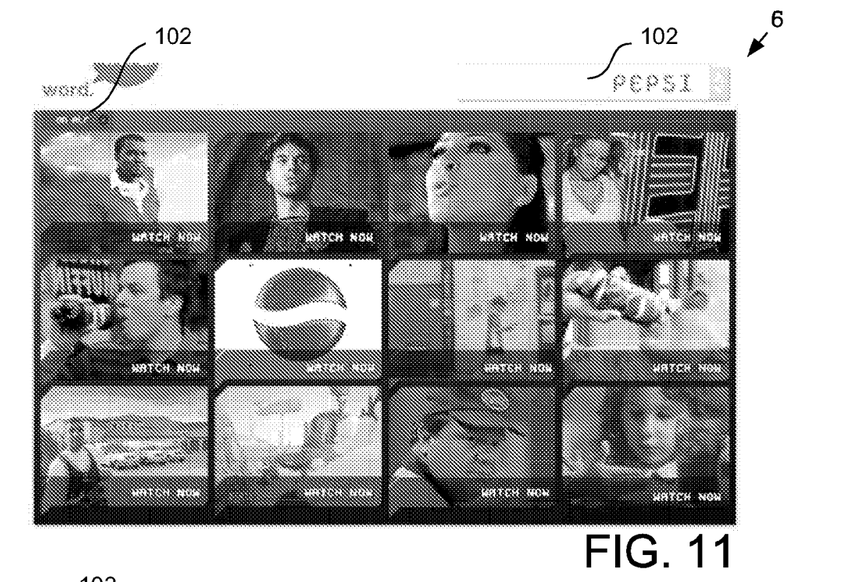
FIG. 11 illustrates a sponsored sneak preview module for a specific word, in accordance with one embodiment of the present invention.
Figure 12:
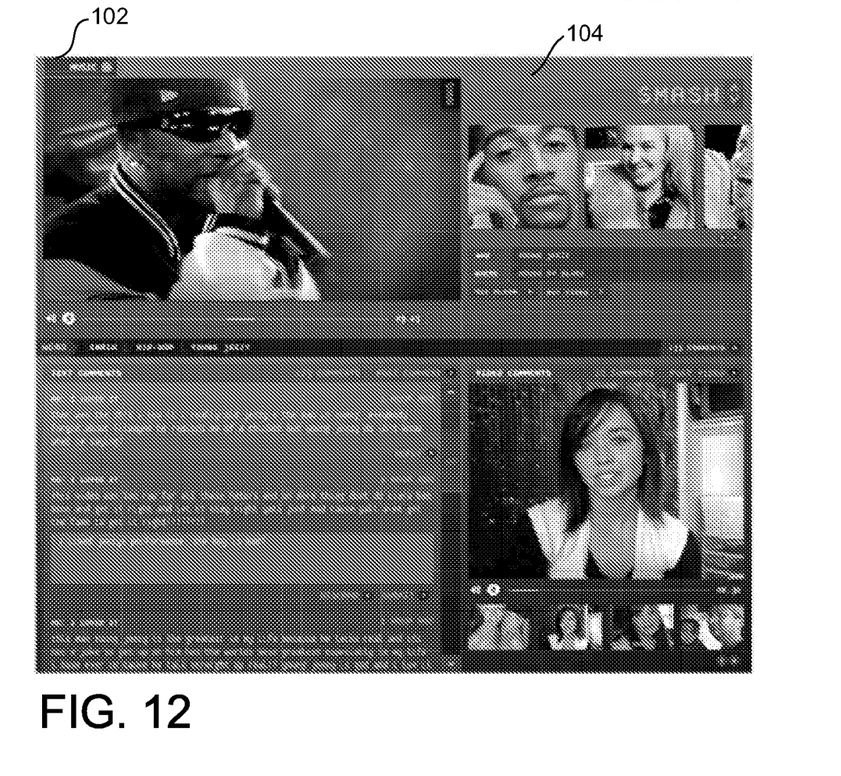
FIG. 12 illustrates a music module as a part of a seamless integration with a group of sponsored modules for a specific word, in accordance with one embodiment of the present invention.

FIG. 11 illustrates a sponsored module 56 in a word page focused on a particular sponsored word 50. Sponsored module 56 includes content from popular music, movie, etc. types along with content related to the sponsored word 50. Popular "non-sponsored" content are mixed with content related to sponsored word 50 to provide better user interactivity with sponsored content. Referring now to FIG. 12, a music module 52c is included in a word page focused on a sponsored word 50. The music module 52c hosts audio or video clips of popular albums or various artists. In one embodiment, popular content that are mixed with sponsored content are updated or refreshed frequently to attract visitors to the sponsored content regularly and repeatedly.

Figure 13:
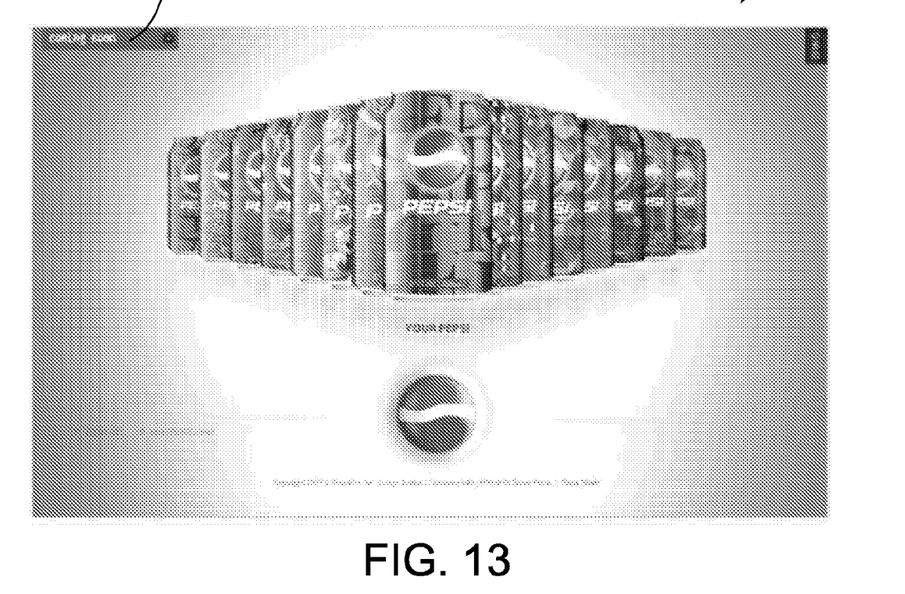
FIG. 13 illustrates a sponsored module by an advertiser, in accordance with one embodiment of the present invention.

FIG. 13 illustrates a sponsored module 56 with a title 102 "Coming soon". A sponsor may add content about one of an upcoming product and can associate this page module with one or more words 50 based on an advertising relationship. Hence, based on a sponsored relationship, this page module may be displayed in a word page focused on "Latest" word 50.

Figure 14:
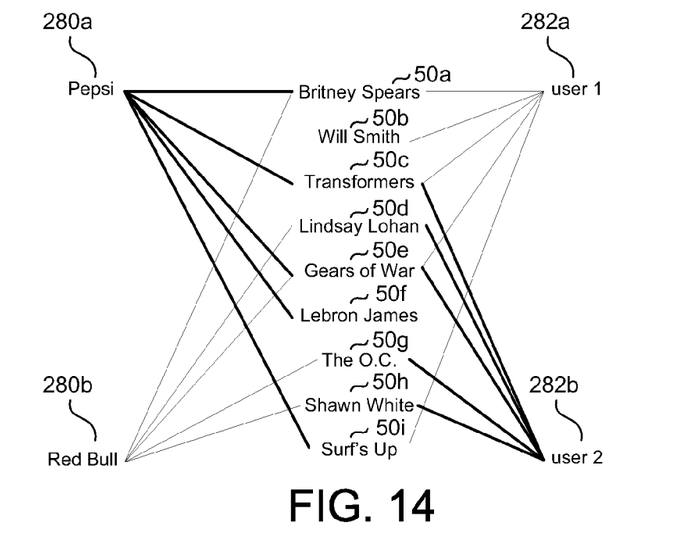
FIG. 14 illustrates a relationship between sponsored words, users, and advertisers with respect to the sponsored words, in accordance with one embodiment of the present invention.

FIG. 14 illustrates a brand mapping by illustrating words 50 in the middle and mapping the words 50 to user 1 282a and user 2 282b on one side, and advertisers Pepsi™ 280a and Red Bull™ 282b on the other side. In a repository or list of words 50 (see FIGS. 16A and 16B), each piece of content (e.g. video, audio, photo, etc.) is mapped to content's related word 50. The word 50 may be a single word or a combination or words, a name of a person, a name of a product, a name of an event, a name of a place, a brand, etc. Similarly, sponsored words may be related to other words 50 and related content. Moreover, sponsored content may be related to non-sponsored words 50. In one example, advertisers could be mapped to the brands/products/celebrities they want to associate with and sponsor so that every time content related to the word "Britney Spears" is displayed, content related to Pepsi™ will also be displayed. In another example, relevancy of content displayed to a user may also be increased by monitoring which products/celebrities user interact with the most and comparing those to the ones that an advertiser sponsors, as discussed in details in the following paragraph.

Still referring to FIG. 14, User 1 282a has indicated his/her liking for "Britney Spears" 50a, illustrated by a line linking user 1 282a with "Britney Spears" 50a. Lines linking Pepsi™ 280a and Red Bull™ 280b to "Britney Spears" 50a are indicating that both Pepsi™ 280a and Red Bull™ 280b are vying for the users who like "Britney Spears" 50a. FIG. 14 also illustrates that user 1 282a likes Transformers 50c and Surf's Up 50i, which Pepsi™ 280a is associated with, hence making Pepsi™ 282a a better match for user 1 280a. User 2 282b, however, will see Pepsi™ 282a for Transformers 50c content but not for Gears of War 50e because User 2 280b is more interested in content associate with Red Bull™ 280b. As apparent, brand mapping information may also help advertisers by showing what their customers are interested in so that the advertisers may make necessary changes in the brand or advertising.

Figure 15:
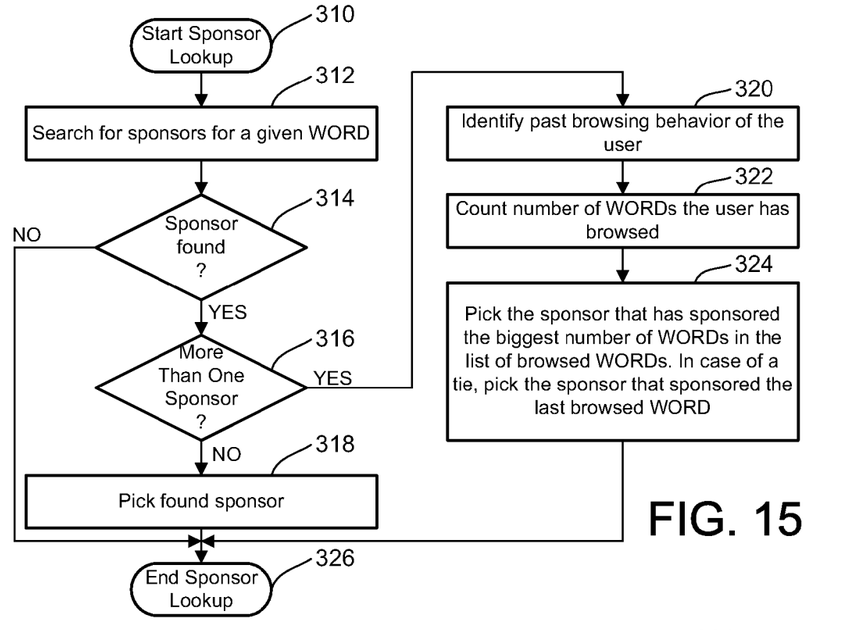
FIG. 15 illustrates a flow diagram to select the advertiser when more than one advertiser has sponsored a word, in accordance with one embodiment of the present invention.

FIG. 15 illustrates a flow control that is employed in the word page generation process in one embodiment, to select or lookup 310 a sponsor for an entered word 50. In one embodiment, a list containing words 50 and the advertisers who intend to advertise their products or services to users through one or more of these words 50, is maintained. After a word 50 is entered by the user, the list containing the words 50 and the advertisers is searched 312. If one or more sponsors or advertisers are found 314 for the entered word, a count is made to see if there is more than one sponsor for the entered word 316. If only one sponsor is found, found sponsor is selected and the lookup process ends 326. If more than one sponsor is found, past user interactivity is identified 320. A count is made for the number of words a user has browsed in the past 322. A sponsor who has sponsored the biggest number of words in the list of browsed words is picked up 324. In case of a tie, a sponsor who sponsored last browsed word by the user is selected and process ends 326.

Figure 16A:
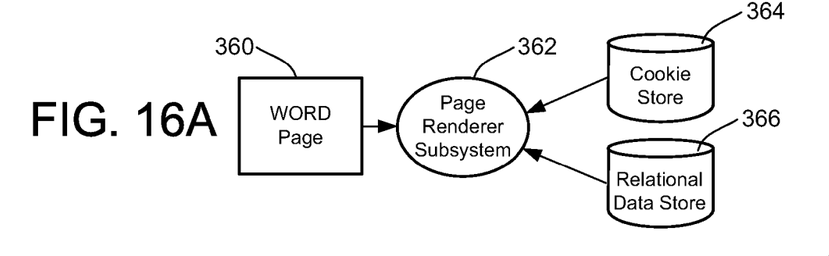
FIGS. 16A and 16B illustrates a system diagram to show a relational database for storing words and their direct and contextually relationships with the contents, in accordance with one embodiment of the present invention.
Figure 16B:
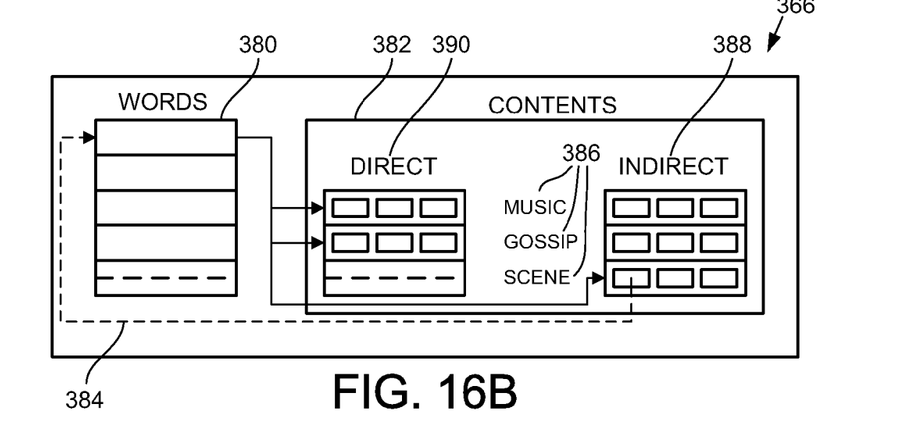

FIGS. 16A and 16B illustrate an apparatus for generating a word page and a relational database to store words 50 and related content, in one embodiment. FIG. 16A illustrates that the apparatus for generating a word page 360 include a page renderer subsystem 362 to interact with databases and other content sources for the purpose of assembling information related to entered word 50. In one embodiment, page renderer subsystem 362 also interact with a cookie store 364 to store and retrieve user interactivity and other information to keep track of browsing behavior, preferences, etc. In one embodiment, the page renderer subsystem 362 uses the cookie store 364 to implement the adaptive personalization process that is illustrated in FIG. 7.

FIG. 16B illustrates a database semantic in one embodiment. A relational database 366 is employed to store a list of words 380 and content 382. Content 382 include directly related content 390 and indirectly/contextually related content 388. An association of entries in the word list and directly related content 390 is also maintained in the relational database 366. An association 384 of entries in the word list 380 is also maintained with indirectly/contextually related content 388. Both directly related content and indirectly/contextually related content include text, media, comments, etc. In one embodiment, one or more relational databases are employed. In another embodiment, a combination of various types of data stores such a relational databases, object databases, active directory server, LDAP server, etc. may be employed.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for installing the widget dock and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A computer-implemented method of dynamically generating a page module for a word, the computer-implemented method comprising:
   (a) reading a word provided for defining the page module;
   (b) searching for text directly associated with the word and text contextually associated with the word, wherein the text is contextually related to the word when the text has some descriptive interrelated connection to or from the word, wherein the page module and the related page modules each have a subject context that is contextually related to a word;
   (c) searching for media directly associated with the word and contextually associated with the word, wherein the media is contextually related to the media when the media has some descriptive interrelated connection to or from the word; and
   (d) identifying a type of page module layout for the word wherein the page module layout includes placeholders for displaying at least some of the text that is directly or contextually associated with the word and at least some of the media that is directly or contextually associated with the word in the page module;
   wherein the page module is integrated into a word page defined by a shell, the shell defines two or more page modules arranged vertically to fill the word page, and placement of the two or more page modules in the shell is determined by an adaptive personalization engine based on interactions, including content views, of a particular user with previous page modules, wherein each of the page modules is displayed in an order in the word page defined by the shell, and in particular subsequent visits to the word page, the page modules are adaptively and automatically reordered vertically within the page module based on an identify of the user interacting with the page modules or a type of user action with the page modules by the user.

2. The computer-implemented method of dynamically generating the page module for the word as recited in claim 1, further comprising enabling display of the page module, including,
   drawing the page module layout on the display screen; and populating the page module layout with at least some of the text that is directly or contextually associated with the word and at least some of the media that is directly or contextually associated with the word.

3. The computer-implemented method of dynamically generating the page module for the word as recited in claim 1, wherein the reading includes receiving the word from one of a title of the page module, a word bar of the page module, a multifunctional search box in the word page.

4. The computer-implemented method of dynamically generating the page module for the word as recited in claim 3, the generating further includes repeating method operations (b) to (d) on selection of the word from the word bar of the page module.

5. The computer-implemented method of dynamically generating the page module for the word as recited in claim 3, the generating further includes repeating method operations (b) to (d) on selection of the word from the title of the page module.

6. The computer-implemented method of dynamically generating the page module for the word as recited in claim 1, further comprising retrieving a sponsored text or media associated with the word wherein an advertiser relates the sponsored text or media with the word.

7. The computer-implemented method of dynamically generating the page module for the word as recited in claim 1, wherein each of the page modules is displayed in an order in the word page defined by the shell, and in particular subsequent visits to the word page, the page modules are adaptively moved up or down vertically within the page module based on an identify of a user interacting with the page modules or a type of interaction with the page modules by the user.

8. The computer-implemented method of dynamically generating the page module for the word as recited in claim 1, wherein the adaptive personalization engine learns relative preferences for various types of content from the interactions of the particular user.

9. The computer-implemented method of dynamically generating the page module for the word as recited in claim 1, wherein the word is a paid word, and the paid word is sponsored by an advertiser.

10. A computer readable medium that is non-transitory and that stores an executable page module for a word wherein the page module is dynamically generated through a user action related to the word, the page module comprising:
   a placeholder substantially in a middle of the page module to display media; a placeholder towards a top of the page module to display a title of the page module; a placeholder towards a top of the page module to display a module search box to enable filtering of content of the page module; and
   a placeholder towards a bottom of the page module to display a number of viewer comments for the page module; wherein the page module is integrated into a word page defined by a shell, the shell defines two or more page modules arranged vertically to fill the word page, and each of the two or more page modules has a subject context that is contextually related to the word and a word bar whose selection causes regeneration of the word page containing the page module, wherein placement of the page modules in the shell is determined by an adaptive personalization engine based on interactions, including content views, of a particular user with previous page modules, wherein each of the page modules is displayed in an order in the word page defined by the shell, and in particular subsequent visits to the word page, the page modules are adaptively and automatically reordered vertically within the page module based on an identify of the user interacting with the page modules or a type of user action with the page modules by the user, and wherein the page module is implemented using a programming language and is executed by one or more processors.

11. The computer readable medium as recited in claim 10, wherein the placeholder to display a plurality of related words further includes a placeholder towards a bottom of the page module to display a plurality of related words, each of the plurality of related words is related to the word with a subject context.

12. The computer readable medium as recited in claim 11, wherein the placeholder to display a plurality of related words further includes a placeholder to display a sponsored word, the sponsored word being associated with the word in the subject context.

13. The computer readable medium as recited in claim 10, wherein the media is one of Audio-Video (AV) media, a still picture, or a paid advertisement.

14. The computer readable medium as recited in claim 13, wherein the placeholder to display the AV media further including a placeholder to display metadata of the video, the metadata including at least a title, a track number, a date of shoot, and actors.

15. The computer readable medium as recited in claim 13, wherein the placeholder to display the AV further includes a user interface to control playing of the video.

16. The computer readable medium as recited in claim 10, wherein the adaptive personalization engine learns relative preferences for various types of content from the interactions of the particular user.

17. A computer-implemented method of defining and arranging page modules related to a word in a word page, the computer-implemented method comprising:
   monitoring relative interest of a user in the page modules by calculating an interest index for the relative interest of the user in the page modules, the calculating of the interest index includes factoring user interactivity with the page modules;
   storing the relative interest of the user in a persistent storage; displaying the page modules in an elevated position in the word page the interest index calculated for each of the page modules; wherein the word page is defined by a shell, the shell defines the page modules arranged vertically to fill the word page, each of the page modules has a subject context that is contextually related to the word, and placement of the page modules in the shell is determined by an adaptive personalization engine based on interactions, including content views, of a particular user with previous page modules,
   wherein each of the page modules is displayed in an order in the word page defined by the shell, and in particular subsequent visits to the word page, the page modules are adaptively and automatically reordered vertically within the page module based on an identify of the user interacting with the page modules or a type of user action with the page modules by the user.

18. The computer-implemented method of arranging page modules in a word page as recited in claim 17, wherein the monitoring includes retrieving the user interactivity of the user with each of the page modules from the persistent storage.

19. The computer-implemented method of arranging page modules in a word page as recited in claim 17, wherein the adaptive personalization engine learns relative preferences for various types of content from the interactions of the particular user.

20. The computer-implemented method of arranging page modules in a word page as recited in claim 17, wherein the calculating includes factoring user demographic information.

21. The computer-implemented method of arranging page modules in a word page as recited in claim 20, wherein the user demographic information include age of the user.

22. A computer-implemented method of dynamically creating a plurality of page modules for a word in a word page on a display screen, the computer-implemented method comprising:

reading a word provided for defining each of the plurality page modules;

searching for text directly associated with the word and text contextually associated with the word;

searching for media directly associated with the word and contextually associated with the word;

identifying a type of each of the plurality of page modules for the word, the type being associated with a page module layout that includes placeholders for displaying at least some of the text that is directly or contextually associated with the word and at least some of the media that is directly or contextually associated with the word in each of the plurality page modules; displaying the plurality of page modules, including, drawing the page module layout for each of the plurality of page modules on the display screen; and populating the page module layout for each of the plurality of page modules with at least some of the text that is directly or contextually associated with the word and at least some of the media that is directly or contextually associated with the word; wherein the word page is defined by a shell, the shell defines the page modules arranged vertically to fill the word page, each of the page modules has a subject context that is contextually related to the word, and placement of the page modules in the shell is determined by an adaptive personalization engine based on interactions, including content views, of a particular user with previous page modules, wherein each of the page modules is displayed in an order in the word page defined by the shell, and in particular subsequent visits to the word page, the page modules are adaptively and automatically reordered vertically within the page module based on an identify of the user interacting with the page modules or a type of user action with the page modules by the user.

23. The computer-implemented method of dynamically creating a plurality of page modules as recited in claim 22, wherein the adaptive personalization engine learns relative preferences for various types of content from the interactions of the particular user.

24. The computer-implemented method of dynamically creating a plurality of page modules as recited in claim 22, wherein the type is a filter of "today" that includes editorial peak at what is big today related to the word, or "music" that includes newest music videos, filterable by genre, related to the word, or "sponsored" that includes paid or sponsored contents related to the word.

25. The computer-implemented method of dynamically creating a plurality of page modules as recited in claim 22, wherein the type is a filter of "games" that includes sneak preview of video games related to the word, or "next" that includes displaying of highlights of top words related to the word that weren't on the word page.

\* \* \* \* \*